US006614947B1

United States Patent
Al-hemyari (10) Patent No.: US 6,614,947 B1
(45) Date of Patent: *Sep. 2, 2003

(54) DIGITAL OPTICAL SWITCH USING AN INTEGRATED MACH-ZEHNDER INTERFEROMETER HAVING A MOVABLE PHASE SHIFTER

(75) Inventor: Kadhair Al-hemyari, Northville, MI (US)

(73) Assignee: LNL Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/718,663

(22) Filed: Nov. 22, 2000

Related U.S. Application Data (60) Provisional application No. 60/167,130, filed on Nov. 23, 1999.

(51) Int. Cl.[7] .................................................. G02F 1/035
(52) U.S. Cl. .............................. 385/3; 385/14; 385/15; 385/19; 385/24; 385/27
(58) Field of Search .............................. 385/1, 2, 3, 14, 385/15, 24, 27, 19

(56) References Cited

U.S. PATENT DOCUMENTS

| | | | | |
|---|---|---|---|---|
| 5,309,532 A | * | 5/1994 | Chang et al. ................... 385/3 |
| 5,323,229 A | * | 6/1994 | May et al. ................... 356/357 |
| 5,418,868 A | * | 5/1995 | Cohen et al. ................... 385/16 |
| 5,479,546 A | * | 12/1995 | Dumais et al. ................ 385/43 |
| 5,627,929 A | * | 5/1997 | Vawter et al. ................. 385/45 |
| 5,991,491 A | * | 11/1999 | Madabhushi ................ 385/131 |
| 6,043,926 A | * | 3/2000 | Williams ..................... 359/326 |
| 6,084,992 A | * | 7/2000 | Weber et al. .................. 385/24 |
| 6,349,158 B1 | * | 2/2002 | Yang et al. .................... 385/24 |
| 6,351,581 B1 | * | 2/2002 | Doerr et al. .................. 385/24 |
| 6,430,322 B1 | * | 8/2002 | Al-hemyari ..................... 385/3 |

FOREIGN PATENT DOCUMENTS

WO    WO 01/38924 A1  *  5/2001  ........... G02B/26/06

* cited by examiner

*Primary Examiner*—Akm Enayet Ullah
*Assistant Examiner*—Jennifer Doan
(74) *Attorney, Agent, or Firm*—Edwards & Angell, LLP (57) ABSTRACT

A Mach-Zehnder interferometer has first and second arms with first and second optical paths, and an optical phase shifter for introducing a phase into an optical signal passing through the second optical path. The optical phase shifter includes first and second waveguides, and a phase shift element disposed in a trench between the waveguides and selective movable between a first position in which the optical signal passing from the first waveguide to the second waveguide does not pass through the phase shift element, and a second position in which the optical signal passing from the first waveguide to the second waveguide passes through the phase shift element to shift the optical signal in phase relative to an optical signal passing along the first optical path.

34 Claims, 6 Drawing Sheets

DIGITAL OPTICAL SWITCH USING AN INTEGRATED MACH-ZEHNDER INTERFEROMETER HAVING A MOVABLE PHASE SHIFTER

CROSS-REFERENCE TO RELATED APPLICATION

This application claims priority to Provisional Patent Application No. 60/167,130, filed on Nov. 23, 1999.

FIELD OF THE INVENTION

The present invention is directed to small-scale Mach-Zehnder interferometer ("MZI") devices and structures. The present invention is also directed to digital optical switches.

BACKGROUND OF THE INVENTION

An optical network, in its simplest representation, consists of an optical source, a destination, and a matrix of devices (e.g., fiber-optical cables, waveguides, cross-connects, amplifiers, etc.) for causing an optical signal generated by the source to reach a desired destination. Physical and geographic boundaries present no impediment to telecommunication, data communication and computing, all of which may utilize all or part of an optical network. Consequently, the number or sources and destinations, and the combinations of sources and destinations and the communication paths therebetween, may be nearly infinite. Optical switches are used in the optical network for facilitating the routing of an optical signal to its desired destination.

Figure 1:
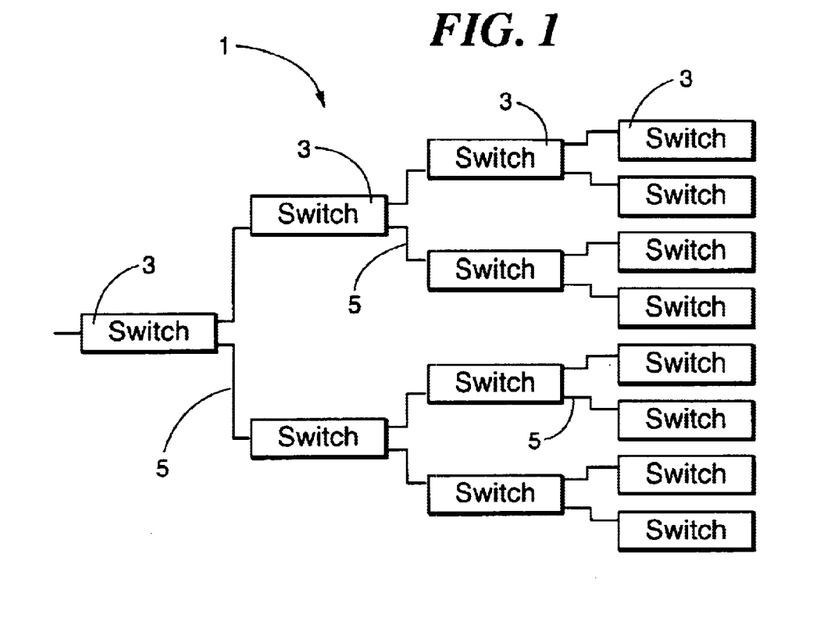
FIG. 1 is a schematic block diagram of a 1×16 switch that is part of a high-density optical component.

By way of example, FIG. 1 depicts a block diagram of a part of an optical component 1 comprising a plurality of optically interconnected optical devices 3 (e.g., switches, filters, etc.), shown in FIG. 1 as switches. As used herein, the terms "optical component" and "component" refer to any and all of a plurality of interconnected devices which may operate using any combination of optical, opto-electrical, and/or electrical technologies and which may be constructed as an integrated circuit. Devices 3 can be optically interconnected by waveguides 5. Various other optical, opto-electrical, and/or electrical devices may also be included in the optical component, as a matter of design choice. As used herein, the terms "optical", "opto-electrical", and "electrical" devices may include, by way of non-limiting example, lasers, waveguides, couplers, switches, filters, resonators, interferometers, amplifiers, modulators, multiplexers, cross-connects, routers, phase shifters, splitters, fiber-optic cables, and various other optical, opto-electrical, and electrical devices. The optical component 1 and devices 3 depicted in FIG. 1 are merely illustrative.

Although a single wavelength of light can be transmitted through the network, in order to increase the network's data-carrying capacity it is preferable to transmit multiple wavelengths of light at the same time. This is currently accomplished using techniques known as wave-division-multiplexing ("WDM"), dense WDM ("DWDM"), and ultra-dense wave-division-multiplexing ("UDWDM").

The ability to separate one optical signal from a plurality of optical signals (or one wavelength from a plurality of wavelengths in an optical signal) propagating within an optical network becomes more important as the number of signals transmitted through a single optical fiber (or waveguide) increases. As optical transmission evolves from WDM to DWDM to UDWDM, and beyond, more and more data contained in a multi-wavelength optical signal is transmitted over the optical network. Optical filters are one component that may be used to extract a desired signal (i.e., a desired wavelength) at a particular point or location in the network and route that signal to its desired destination, while also permitting other signals to continue along the network.

Optical networks transmit data as pulses of light through waveguides in a manner similar to electrical networks, which send pulses of electricity through wiring. Transmitting an optical signal between waveguides, which may occur in various devices employed in an optical network, may require the optical signal to leave one waveguide and propagate through one or more materials (mediums) before entering another waveguide. It is likely that at least one of the devices will have an index of refraction different than the index of refraction of the waveguides (which typically have approximately the same refractive index). It is known that the transmission characteristics of an optical signal may change if that signal passes through materials (mediums) having different indices of refraction. For example, a phase shift may be introduced into an optical signal passing from a material having a first index of refraction to a material having a second index of refraction due to the difference in velocity of the signal as it propagates through the respective materials and due, at least in part, to the materials' respective refractive indices. As used herein, the term "medium" is intended to be broadly construed and to include a vacuum.

If two materials (or mediums) have approximately the same index of refraction, there is no significant change in the transmission characteristics of an optical signal as it passes from one material to the other. Accordingly, one solution to the mismatch of refractive indices in an optical switch involves providing an index matching or collimation fluid to offset any difference in refractive indices. Consequently, the optical signal does not experience any significant change in the index of refraction as it passes from one waveguide to another.

An example of this approach may be found in international patent application number WO 00/25160. That application describes a switch that uses a collimation matching fluid in the chamber between the light paths (i.e., between waveguides) to maintain the switch's optical performance. The use of an index matching fluid introduces a new set of design considerations, including the possibility of leakage and a possible decrease in switch response time due to the slower movement of the switching element in a fluid.

In addition, the optical signal will experience insertion loss as it passes between waveguides. A still further concern is optical return loss caused by the discontinuity at the waveguide input/output facets and the trench. In general, as an optical signal passes through the trench, propagating along a propagation direction, it will encounter an input facet of a waveguide which, due to physical characteristics of that facet (e.g., reflectivity, verticality, waveguide material, etc.) may cause a reflection of part (in terms of optical power) of the optical signal to be directed back across the trench (i.e., in a direction opposite of the propagation direction). This is clearly undesirable because the reflected signal will interfere with the optical signal propagating along the propagation direction.

Reflection of the optical signal back across the trench also can create problems if the facets not only are coaxial, but also are parallel to one another. That arrangement forms a Fabry-Perot resonator cavity, which, under the appropriate circumstances, allows for resonance of the reflected signal, in known fashion.

Size is also an ever-present concern in the design, fabrication, and construction of optical components (i.e., devices, circuits, and systems) for use in optical networks. It is strongly desirable to provide smaller optical components so that optical devices, circuits, and systems may be fabricated more densely, consume less power, and operate more efficiently.

Currently, optical switches can be constructed using a directional coupler or a Mach-Zehnder interferometer ("MZI"), as is generally known in the art. Mach-Zehnder interferometers are known devices which take an input optical signal, split the signal in half (generally, in terms of optical power), direct the split signals along different optical paths, apply a phase shift to one of those split signals, recombine the signals and then feed those combined signals as a single signal to an output. The amount by which the phase of one of the signals is changed will, in known fashion, affect the nature of the output signal.

Conventional Mach-Zehnder interferometers shift the phase of light traveling along one of the interferometers in one of several ways. If the electro-optic effect is used, one of the interferometer arms is made from a medium having an index of refraction which changes in the presence of an applied electrical field. Similarly, if the electro-thermal effect is used, the interferometer has an arm made from a medium having an index of refraction that changes as the temperature of the material changes. In each of these devices, changing the index of refraction of one of the interferometer arms is comparable to changing that arm's optical length, and results in a relative phase shift between the two split signals. In another known type of MZI, one of the two interferometer arms is actually longer (and thus, optically longer) than the other, and this also results in a relative phase shift between signals propagating in each arm.

In the electro-optic and electro-thermal type devices, the conditions for effecting optical switching in a device using a MZI, which operates by introducing a phase shift of up to π (i.e., 180°) into at least a part of the optical signal, are defined by the equation:

$$\Delta\phi = \pi = \frac{2\pi}{\lambda}\Delta nL \qquad (1)$$

where $\Delta\phi$ is the maximum possible phase shift of π, λ is the wavelength of the optical signal propagating in the device, L is the actual length of the device, and $\Delta n$ is the change in refractive index effected by the application of a carrier signal, electrical field, or change in temperature to the device. Since the change in refractive index typically achievable for current optical devices is on the order of approximately $10^{-3}$, the actual length of the device needed to introduce a maximum phase shift of π must be at least 1 mm, and preferably longer. However, to achieve large-scale density integration, the actual length L must be reduced without sacrificing the ability to effect a π phase shift, or at least substantially π in an optical signal. Those two requirements are mutually exclusive.

If the phase is to be applied using a MZI device having different length arms, the light traveling through the longer arm has its phase shifted relative to the light passing through the other arm. This technique cannot, however, be used to make compact optical switches.

There exists a genuine need in the art for compact optical switches that can effect a 0-π phase shift and which overcome the above-described shortcomings of the prior art. Preferably, such switches would combine small size and high actuation speed with low power consumption.

SUMMARY OF THE INVENTION

The present invention is directed in part to a digital optical switch having a movable phase shift element in one interferometer arm suitable for use in an optical network. The present invention is also directed to a Mach-Zehnder interferometer device ("MZI") that can selectively apply a desired phase shift, such as π or substantially π, to an optical signal propagating through one of the MZI's arms. A device according to this invention may be more compact and more rapidly actuated than comparable known devices.

A MZI in accordance with this invention can be constructed by providing in one of the MZI's two arms a phase shifter which imposes a predetermined phase shift upon light passing through that arm. The present invention combines the strong photon confinement characteristics of waveguides and the functionality of a Mach-Zehnder interferometer to provide a compact optical device suitable for large-scale (i.e., dense) integration.

More particularly, this invention is directed to improved M×M switches which employ Mach-Zehnder interferometers to control optical signals. In one embodiment the MZI is part of a 1×1 switch, and in another embodiment the MZI is part of a 2×2 switch. As already explained, MZI devices operate by dividing an input optical signal into two signals, applying a phase shift to just one of those signals, and then recombining the two signals. The output will depend upon the magnitude of the phase shift applied. As noted previously, known switches of this type are larger than desired because the MZI devices used therein operate using techniques which thwart miniaturization.

Switches according to the present invention differ from known optical switches because of the unique MZI provided in accordance with the present invention. A MZI constructed in accordance with embodiments of the present invention includes a phase shifter in one interferometer arm. The phase shift element is selectively moveable into and out of an optical path defined by and through the interferometer arm so as to introduce a predetermined phase shift into an optical signal propagating in and through that interferometer arm. This arrangement dramatically reduces the size of the MZI as compared with conventional optical switches, which may employ the electro-optic, electro-thermal or asymmetric arms to introduce a phase change in an optical signal. A MZI using a phase shifter in accordance with this invention is far more compact than a MZI which uses those known techniques.

The present invention is particularly applicable to optical switches that are formed on integral planar optical substrates. Generally speaking, an integrated planar optical substrate refers to a relatively flat member having a supporting substrate and a number of layers of different materials formed thereon. The substrate and the different materials have particular optical qualities so that optically useful structures such as waveguides can be formed on the supporting substrate by suitable shaping or other processing.

As explained in greater detail below, this invention involves phase shifters constructed using small-scale fabrication techniques. This invention also encompasses phase shifters made using other fabrications techniques which result in comparable devices.

The present invention takes advantage of the extremely small mechanical actuators which can be assembled using small-scale fabrication techniques, and so significantly reduces the room needed on a chip for optical switches. These more compact switches require less chip space and so provide for denser integration of a plurality of optical devices in an optical component. This invention also takes advantage of the strong photon confinement properties of small-scale waveguides, such as are disclosed in U.S. Pat.

No. 5,878,070 and 5,790,583. Together these developments facilitate construction of optical devices that provide the benefits and advantages of the present invention.

One embodiment of the present invention involves a Mach-Zehnder interferometer having a single input, a single output, and first and second arms extending along an optical path direction of the interferometer. One arm has a phase shifter disposed therein. When the phase shifter is actuated an optical signal propagating through the arm having the phase shifter will experience a phase shift relative to an optical signal propagating through the other arm.

In accordance with the present invention, a MZI may be constructed with a selectively moveable phase shift element in one interferometer arm. That phase shift element may be moved into and out of an optical path defined by and through that interferometer arm so as to introduce a phase shift into an optical signal propagating in and through that arm. In so doing, the phase shift element changes the optical length of that arm, when compared with the optical length of the other interferometer arm. By way of non-limiting example, the phase shift element may be generally rectangular or square.

While it is generally known to provide a MZI as an element of an optical switch, a MZI constructed in accordance with the embodiments of the present invention provides significant advantages over prior art MZI devices and optical switches. For example, the micron-scale of the MZI enables construction of smaller optical switches that consume less on-chip real estate. The power requirements of the MZI to effect a desired phase change in an optical signal are also significantly reduced when compared with prior art MZI devices.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention is directed to optical devices employing a Mach-Zehnder interferometer ("MZI") device having a phase shifter provided in one of the interferometer arms. The present invention enables the construction of significantly smaller optical device than typical photonic devices, and significantly reduces the amount of on-chip real estate occupied by such devices, while not affecting the ability of such devices to introduce a predetermined phase shift in an optical signal.

The present invention takes advantage of the extremely small mechanical actuators which can be fabricated using small-scale fabrication techniques, and so significantly reduces the room needed on a chip for optical switches. These more compact switches require less chip space and so provide for denser integration of a plurality of optical devices in an optical component.

Another remarkable benefit which results from the present invention is a reduction in size of the Mach-Zehnder interferometer. A MZI using a phase shifter in accordance with this invention is far more compact than a MZI which induces a phase shift using known techniques.

As used herein, a "digital switch" has precisely two output states. One state allows a signal to propagate through the switch without change, and arises when the phase shift element is shifted out from between the facets through which light passes. The other state prevents a signal from leaving the switch, and this occurs when the phase shift element is placed between the end facets. In the latter state, light does not leave the switch because the MZI device splits and recombines the light in a manner which cancels out the light signal.

The term "light" as used herein should be construed in the broadest possible sense. For example, the term "light" is intended to include visible electromagnetic radiation, as well as infrared and ultraviolet radiation.

The term "waveguide", as used herein, refers generally to a photonic-well or photonic-wire structure that provides strong photon confinement. The term waveguide is not intended as a limitation on the construction, shape, materials, functionality, or any other aspect of the optical device of the present invention, but merely as a general reference.

Figure 2:
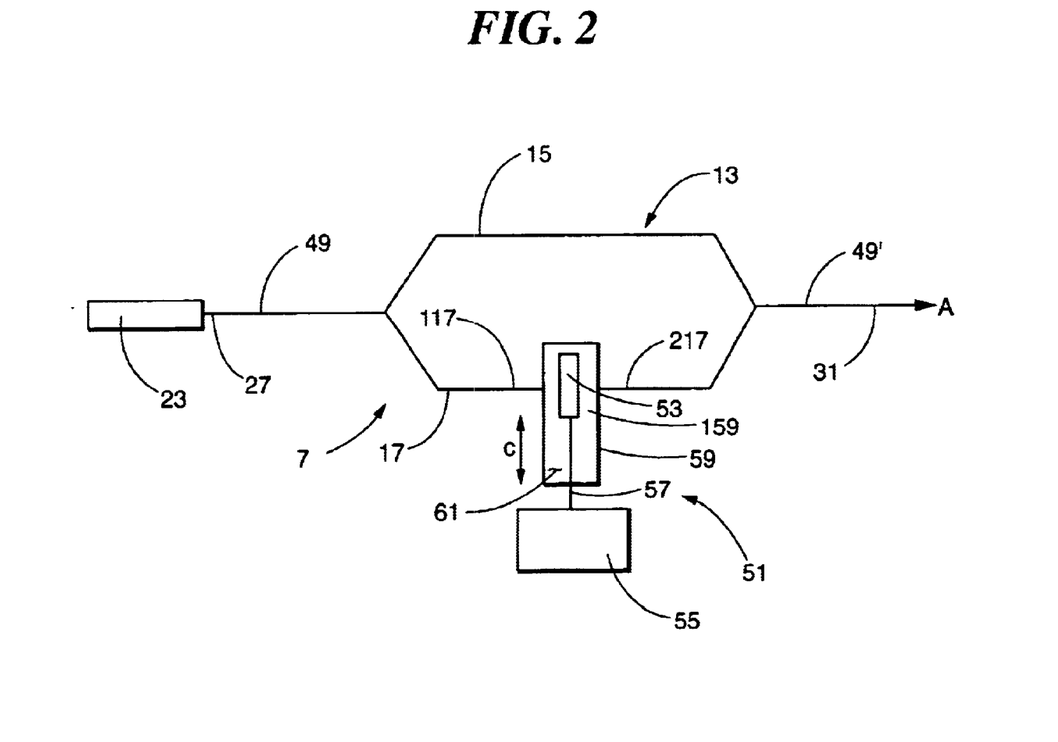
FIG. 2 is a schematic diagram of a 1×1 optical switch having a Mach-Zehnder interferometer constructed in accordance with the present invention.

Referring now to the drawings in detail, and with initial reference to FIG. 2, a Mach-Zehnder interferometer (MZI) 13 is used to construct a 1×1 optical switch 7. The switch 7 may receive at an input 27 an optical signal input via an input waveguide 49 and from an optical source 23, which by way of example and not limitation may include a laser, fiber-optic cable, or other upstream (along the optical path direction) light generating or light propagating device or system. The optical signal may be a single- or multi-wavelength signal. An output 31 via output waveguide 49' is controllable by the MZI 13, as described in greater detail below.

The MZI 13 has first and second arms 15, 17 optically connecting the input 27 through input waveguide 49 to output waveguide 49' and the output 31. Light travels along an optical path defined by and through the input and output waveguides 49, 49' and the MZI arms 15, 17 in a direction generally indicated by arrow A in FIG. 2. In contrast to known MZI devices, present invention provides a phase shifter 51 in one MZI arm to introduce a phase shift into an optical signal propagating in and through that arm and thus control the output 31 of the MZI 13 and an optical switch 7 that includes the inventive MZI 13.

With continued reference to FIG. 2, the optical signal traveling along input waveguide 49 splits approximately and preferably equally (in terms of signal amplitude or power) to each of the first and second arms 15, 17 of the MZI 13. After passing through each of the first and second arms 15, 17, the divided optical signal is recombined and then transmitted along output waveguide 49' to output 31.

Notwithstanding the unique construction of the phase shifter formed in the second arm 17 provided by the present invention and described below, the MZI 13 of the present invention functions in a fashion similar to other Mach-Zehnder devices. For example, a phase shift of 180° ($\pi$), or substantially 180°, may be introduced into an optical signal propagating in the interferometer's second arm 17 when the phase shifter is actuated to alter the phase of light traveling through that second arm 17, and this will determine whether light is output from the switch 7. The mechanism through which such a 1×1 MZI switch routes light passing from the input to the output paths is known, and so need not be described.

Figure 5A:
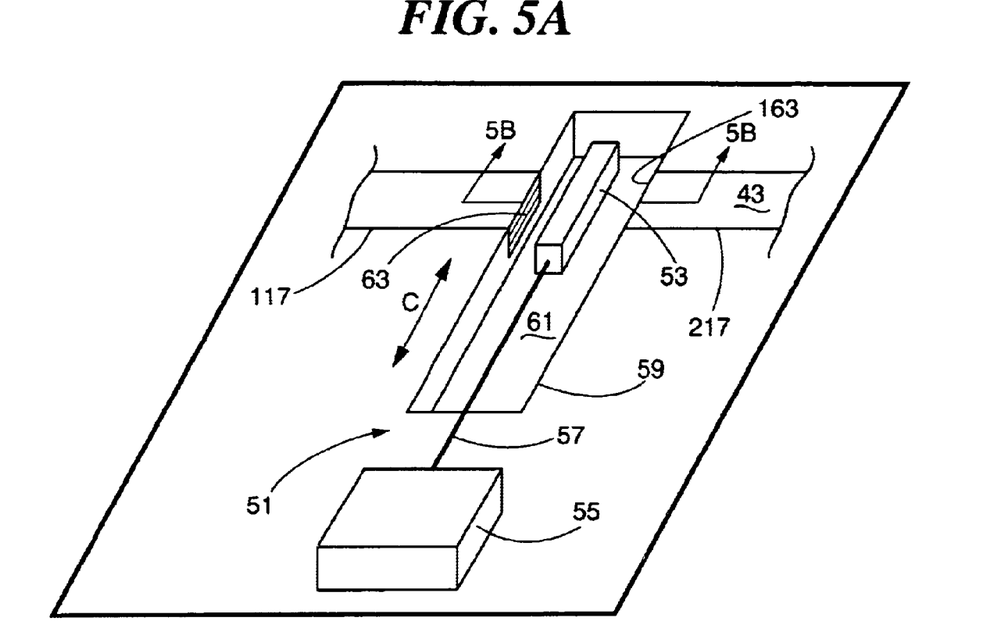
FIG. 5A is a perspective view of a phase shifter constructed in accordance with an embodiment of the present invention.
Figure 5B:
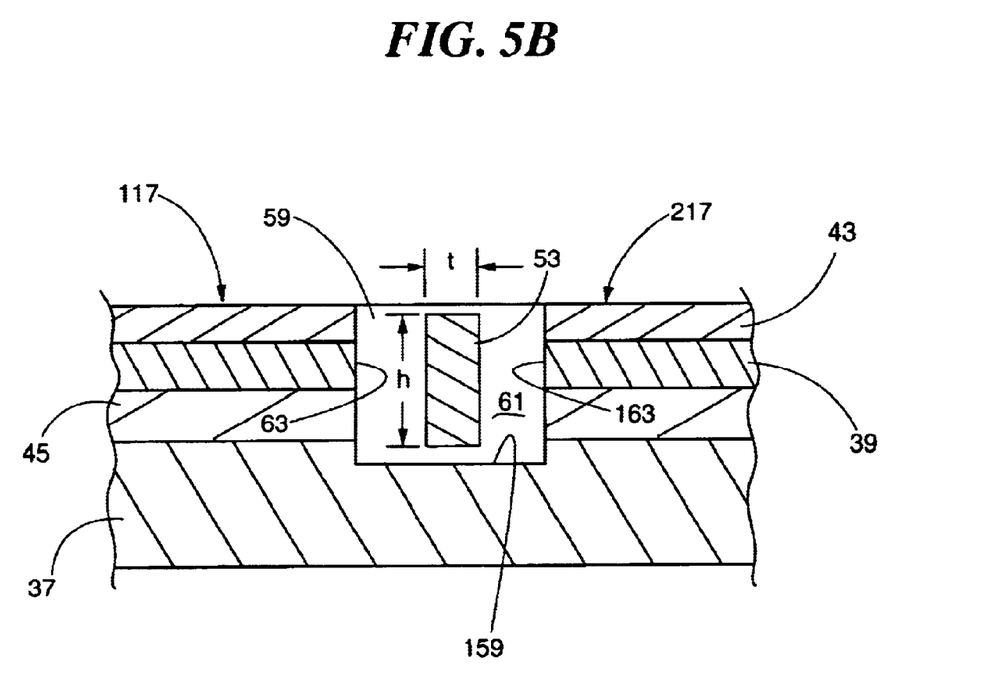
FIG. 5B is a cross-sectional view taken along line 5B—5B of FIG. 5A.
Figure 6:
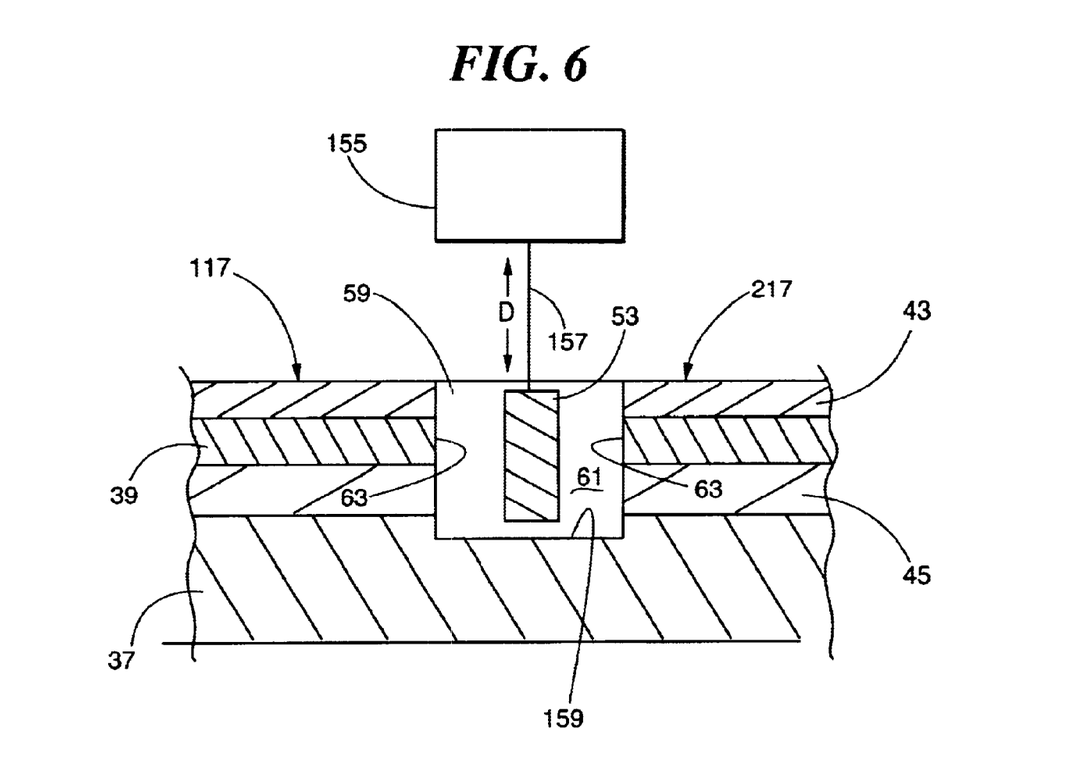
FIG. 6 is a cross-sectional view showing an alternate configuration to that shown in FIG. 5B.

In accordance with the present invention, a phase shifter 51 is provided in one interferometer arm 17 (which arm is a routine matter of design choice). With continued reference to FIG. 2, and with additional reference to FIGS. 5 and 6A, one embodiment of the phase shifter 51 of the present invention will now be described in detail. The interferometer arm 17 in which the phase shifter 51 is provided is non-continuous, although defining a continuous optical path. Thus, that interferometer arm 17 comprises two waveguides 117, 217, separated by a region or trench 59 within which is provided the phase shift element 53, which is a part of the phase shifter 51. An optical signal propagating in and through the interferometer arm 17 will pass through phase shift element 53 or not, depending upon whether phase shift element 53 is positioned in or out of the optical path defined by and through that waveguide 117, trench 59 and waveguide 217. When the phase shift element 53 is positioned in the optical path, the phase of an optical signal propagating in and through interferometer arm 17 will be changed, as described in more detail below.

In one embodiment of the present invention, depicted in FIGS. 1, 5A, 5B and 6, the phase shifter 51 preferably comprises a planar (rectangular prism) phase shift element 53 connected to an actuator 55 by a link 57. That actuator 55 and link 57 may cause selective movement of the phase shift element 53 into and out of the optical path, thus changing the phase of an optical signal propagating in and through interferometer arm 17 (and waveguides 117, 217). For example, when the phase shift element 53 is positioned as depicted in FIGS 1, 5A, 5B and 6, the optical signal will experience a phase shift. If the actuator 55 is activated to move the phase shift element out from between waveguides 117, 217, then no phase shift will be applied to the optical signal traveling from waveguide 117 across trench 59 to waveguide 217.

Phase shifts can therefore be applied and removed as desired by moving the phase shift element 53 along the trench 59 between a first position in which the phase shift element 53 lies between the waveguides 117, 217 and a second position in which the phase shift element 53 does not lie in the path of light traveling across the trench 59.

If desired, phase shifter 51 could be arranged so that actuator 55 is disposed between arms 15, 17.

Generally, phase shift element 53 is constructed of optically transparent material. The element 53 preferably has certain optical qualities, in particular, a refractive index different from that of the waveguides 117, 217 and from the medium provided in the trench 59, which may be air or a vacuum, for example. Light passing between the waveguides 117, 217 through the phase shift element 53 will experience a change in velocity and thus a phase shift due to the difference in refractive indices. Since the phase of light passing through phase shift element 53 is affected by both the phase shift element's index of refraction and its width, these values can be selected to impart the desired phase shift. It is presently preferable for the phase shift element 53 to introduce a phase shift of either approximately 0° when the element 53 is not in the optical path, or substantially 180° ($\pi$) when the element 53 is in the optical path 53.

As shown in FIGS. 5 and 6A, such a phase shift element 53 may be planar, and is preferably oriented perpendicular to the longitudinal axis of the waveguides 117, 217. The material has a width w chosen to provide the desired amount of phase change, and a length l. Since the phase of light that has passed through phase shifter 51 is a function of both the phase shift element's index of refraction and width, these values can be chosen to provide a phase shift element 53 which imparts the desired phase shift. Other than inducing a phase shift, the material used in the phase shift element 53 should not significantly alter (i.e. absorb) the characteristics of the light which passes therethrough.

With continued reference to FIGS. 2 and 6A, phase shift element 53 is preferably a rectangular prism having a height h sufficient to completely intercept and thereby shift light passing between waveguides 117 and 217 when the phase shift element 53 is positioned in the optical path.

The phase shift element 53 has a length l that is preferably minimized to reduce the distance by which the phase shift element 53 is moved between the first and second positions (i.e., positions in and out of the optical path, for example), or the distance by which the element 53 is moved to change the phase shift from one value to another. The minimized length l may also reduce the power needed to cause the phase shift element 53 to move into and out of the optical path and improves the switch's response speed.

Phase shift element 53 preferably has a width t. Since the width t of the phase shift element 53 directly affects the insertion loss through the MZI 13 and switch 7, a thinner phase shift element 53 may be preferred. Optical loss of light due to light diffraction in the trench 59, also can be minimized by having the smallest possible phase shift element width t.

So that all of the light beam strikes the phase shift element 53, the height h and width t of the phase shift element 53 should be greater than the corresponding dimensions of the core 39 of waveguide 117. The construction of waveguides 117, 217 will now be discussed.

Figure 4:
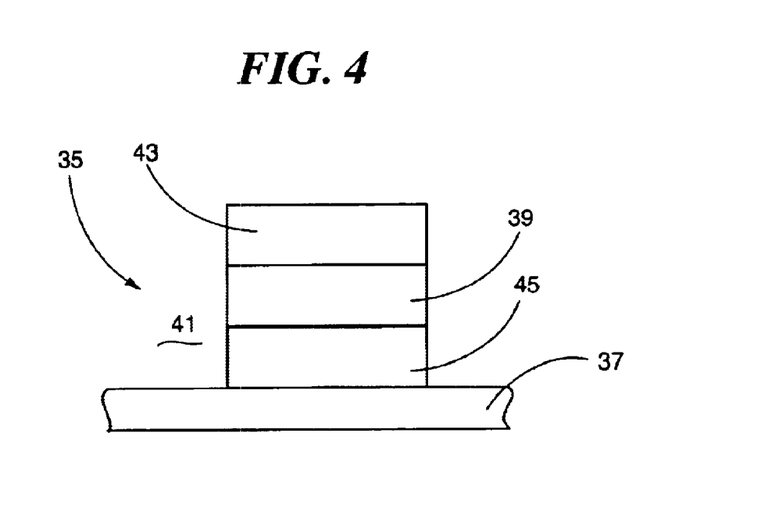
FIG. 4 is a cross-sectional view of a photonic-wire waveguide.

With continued reference to FIG. 2, a preferred construction of an MZI 13 and switch 7 in accordance with the present invention will now be discussed in detail. The switch 7 and MZI 13 are generally constructed as waveguides, such as depicted in FIG. 4, which depicts an illustrative, non-limiting cross-sectional representation of a strongly confined waveguide 35. The waveguide 35 is constructed on a substrate 37 and is comprised of a relatively high (e.g., n=3.5) refractive index core 39 surrounded on at least two sides (in the horizontal direction in FIG. 4) by a relatively low refractive index medium 41 such as air. The core 39 is sandwiched between upper and lower cladding layers 43, 45.

The present invention contemplates waveguides constructed in lithium niobate, silica/glass, and other semiconductor materials provided that strong confinement (at least in the horizontal direction in FIG. 4) is achieved.

With continued reference to FIG. 4, the waveguide 35 there depicted in cross-section may comprise either a photonic-well or a photonic-wire waveguide. Exemplary photonic-wire and photonic-well devices are respectively disclosed in U.S. Pat. Nos. 5,878,070 and 5,790,583, the entire disclosure of those patents being incorporated by reference herein. The waveguide 35 can be formed of semiconductor materials for on-chip integration with other devices such as a semiconductor laser. A wafer epitaxial growth process, or other now known or hereafter developed semiconductor fabrication process, may be used to form the various semiconductor layers of the waveguide 35 on the substrate 37. As depicted in FIG. 4, a lower cladding layer 45, preferably of $SiO_2$, is formed on the substrate 37, which is preferably either silicon or quartz-based (e.g., Si). A core 39 is formed on the first cladding layer 45 and may include, by way of non-limiting example, $SiO_2$. An upper cladding layer 43, also preferably of $SiO_2$, is formed on the core 39.

For a photonic-wire construction, the refractive index of the core 39 is generally greater than that of all of the upper and lower cladding layers 43, 45, and the surrounding medium 41. In a photonic-wire waveguide 35, the upper and lower cladding layers 43, 45 have a very low refractive index as compared to the refractive index of the core 39 and thus strongly confine photons in all directions about the waveguide core 39. Typical low refractive index mediums for use in practicing the present invention have refractive index below about 2.0, preferably below 1.6, such as from about 1.5 to about 1.0. The ratio of the refractive indices between the core 39 and each of the upper and lower cladding layers 43, 45 and the surrounding medium 41 is preferably larger than about 1.3.

For a photonic-well construction, the refractive index of the core 39 is generally greater than that of the surrounding medium 41, with the upper and lower cladding layers 43, 45 having a refractive index close to that of the core 39 and thus weakly confine photons within the waveguide 35 in the vertical direction. However, strong lateral confinement is still provided by the difference between refractive index of the core 39 and the relatively low refractive index cladding medium 43, 45 laterally surrounding the core 39. In a photonic-well waveguide 35, the cladding layers 43, 45 may have a refractive index of about 3.17 as compared to the refractive index of 1 for air or of 1.5 for silica. The refractive index of cladding layers 43, 45 is slightly less than the refractive index of core 39, which is preferably about 3.4.

Presently it is believed that silica-based ($SiO_2$) materials are thought to be preferable for constructing waveguides for the various embodiments of the present invention. In particular, core 39 might include germanium oxide doped silica deposited atop a silica substrate 37, while cladding 43 and 45 may include boron-phosphine doped silica glass. Other materials which could be used for the core 39 include indium phosphide and gallium arsenide, and the cladding 43, 45 could be made with indium phosphide, gallium arsenide, aluminum oxide, silicon nitride or polymers, or some combination thereof.

The core 39 can be rectangular, with sides running from approximately 3–10 $\mu$m thick and approximately 3–15 $\mu$m in width. More preferably, the core 39 is square, with sides from approximately 6–8 $\mu$m thick and 6–14 wide. The upper and lower cladding layers 43, 45 adjacent to core 39 can be approximately 3–18 $\mu$m thick, and are preferably approximately 15 $\mu$m thick.

The present invention will work with both weakly-confined waveguides and strongly-confined waveguides. Presently, use with weakly-confined waveguides is preferred.

Figure 3:
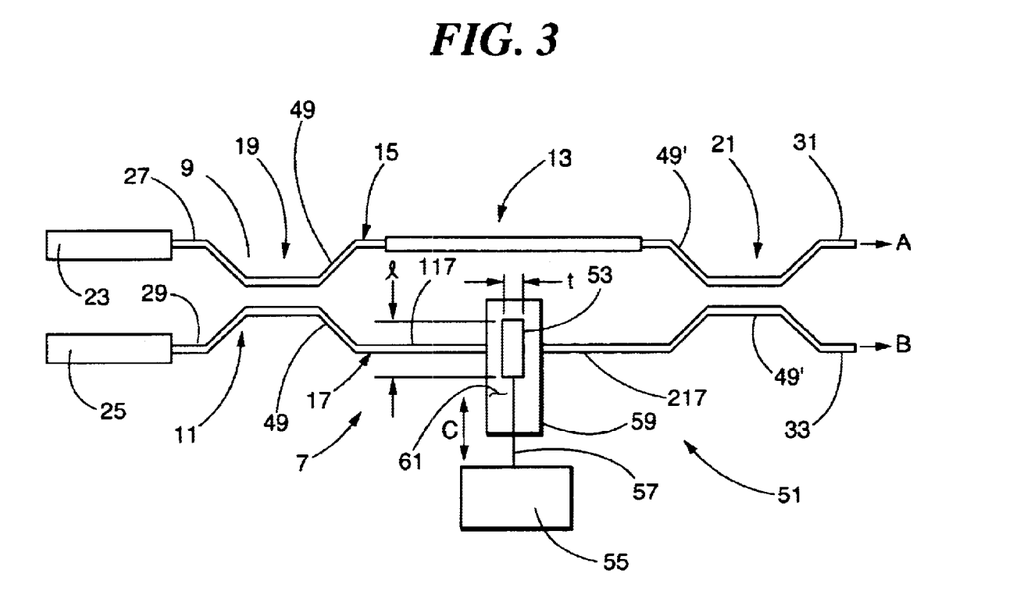
FIG. 3 is a schematic diagram of a 2×2 optical switch having a Mach-Zehnder interferometer constructed in accordance with the present invention.

Referring next to FIG. 3, a 2×2 optical switch 7 having two branches 9, 11 and constructed in accordance with another embodiment of the present invention is depicted. The switch 7 includes a MZI 13 having first and second arms 15, 17 optically connecting an input coupler 19 and an output coupler 21 along an optical path direction of the switch 7, generally indicated by arrows A and B. The couplers 19, 21 depicted in FIG. 3 may be co-directional, 3 dB couplers, by way of non-limiting example. Alternatively, Y-branches or multi-mode interferometer (MMI) couplers may be provided, as a routine matter of design choice.

The switch 7 may receive an optical signal input from either one of two optical sources 23, 25, each of which may, by way of example only, and not in a limiting sense, include a laser, fiber-optic cable, or other upstream (along the optical path direction) light generating or light propagating device or system. A first optical signal may be directed into an input 27 of the switch 7 by first optical source 23. The first optical signal may comprise a single- or multi-wavelength signal, and as explained hereafter may be selectively switched in a known manner to either output 31 or 33. Similarly, and alternatively, a second optical signal may be directed into an input 29 by a second optical source 25, and may also be selectively switched to either of output 31 or 33. The optical signal output from the switch 7 via outputs 31 and 33 are sine and cosine functions of wavelength, respectively (as described in greater detail below), and thus are complementary.

With continued reference to FIG. 3, an optical signal from an optical source 25 or 27 may pass through the input coupler 19 which functions as a 50:50 splitter to direct approximately one-half (in terms of signal amplitude or power) of the input optical signal to each of the first and second arms 15, 17 of the MZI 13. The split optical signal passes through each of the first and second arms 15, 17, is recombined by the output coupler 21, and is then output from either output 31 or 33, according to the phase shift introduced in the optical signal by the MZI 13. As described above, actuating the phase shifter 51 causes an optical signal propagating in arm 17 to undergo a phase shift, preferably of 180° ($\pi$). The non-phase shifted optical signal (propagating through first branch 9 and first arm 15, for example) combines with the phase shifted optical signal (propagating through second branch 11 and second arm 17, for example) via the output coupler 21. In known manner the optical signal may be switched between the two output ports 31 and 33 of the switch 7 according to the relative phase of the optical signal propagating in and through the two arms 15, 17 of the MZI 13.

The two output ports 31, 33 of the switch 7 are complementary and respectively provide in known manner an optical signal of the form:

$$P_A=\sin^2(\Delta\phi/2) \text{ and } P_B=\cos^2(\Delta\phi/2) \qquad (2A, 2B)$$

Consequently, the relative phase shift between the two arms 15, 17 of the interferometer 13 will determine how the optical signal is switched between the two output ports 31, 33 of the switch 7. It will be understood that where Δϕ is 0°, all of the output will appear as $P_B$, whereas if Δϕ is 180° (π), all of the output will appear as $P_A$.

The planar phase shift element is preferably rectangular and can be from approximately 1–8 μm thick, approximately 10–100 μm high, and approximately 10–100 μm long. Preferably, the planar phase shift element is approximately 2 μm thick, approximately 30–40 μm high, and approximately 30–40 μm long, and made from silicon. By way of non-limiting example, other materials such as polymers, metallic materials, or dielectric films also could be used.

Other than inducing a phase shift, the material used in the phase shift element 53 should not significantly alter (i.e., absorb) the characteristics of the light which passes therethrough.

Although the foregoing discussion of this invention involved a planar phase shift element, this invention encompasses other constant phase shift elements. By way of non-limiting example, alternative non-planar phase shift elements could be employed, as long as they apply a constant phase shift to transmitted light. One such phase shift element could be a variable thickness member whose index of refraction varies inversely with its thickness. Such other phase shift elements are, for the purpose of considering infringement only, considered to be equivalent to the planar phase shift element 53.

With reference to FIGS. 2, 5 and 6A, phase shift element 53 is preferably oriented approximately perpendicular to the optical path direction, through waveguides 117, 217.

Figure 7A:
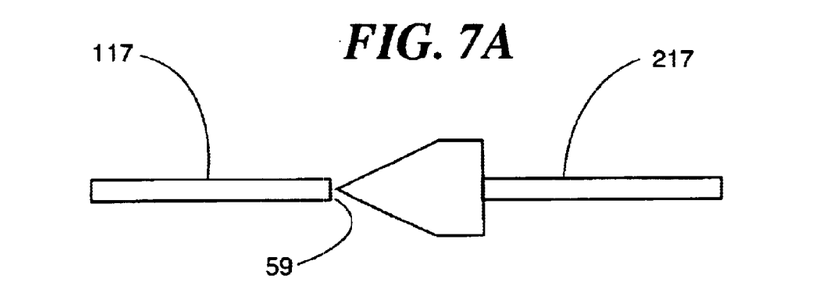
FIGS. 7A and 7B show the relationship between beam diffraction and trench length for light passing across a trench between waveguides.
Figure 7B:
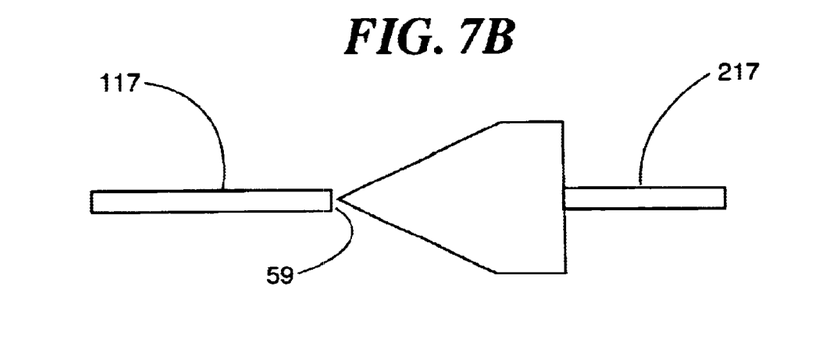

The width of the trench 59 between the waveguides 117, 217 is preferably minimized to reduce diffraction of the optical signal as it propagates across the trench 59 and between the waveguides 117, 217. For example, and as depicted in FIGS. 14A and 14B, greater diffraction of the optical signal is likely to occur with greater trench widths. Since the light diffracts more as the trench width increases, optical signal loss will occur from waveguide 117 to waveguide 217. It is therefore preferable to provide a trench 59 having as short a width as practical and to position the ends 63, 163 of waveguides 117, 217 as close to each other as possible.

The trench can be from approximately 8–40 μm wide. Preferably, the trench is approximately 12–20 μm wide.

There are several ways to control diffraction of the light as it crosses the trench 59. Diffraction can be controlled by separating the ends 63, 163 of waveguides 117, 217 by a distance only slightly greater than the widest part of the phase shift element 53, as depicted in FIGS. 6A and 6B. It is thus desirable to provide as narrow a trench 59 as possible to minimize light diffraction losses as light propagates through and across the trench 59. Trench widths ranging from approximately 10 to 35 μm are presently thought to be preferable.

At the same time there are factors which limit how narrow a trench 59 can be provided. A narrow trench 59 may complicate aligning the facing waveguides 117, 217, and may not be able to accommodate a phase shift element 53 of width sufficient to apply the maximum desired phase shift for the tuning range of interest.

Figure 8A:
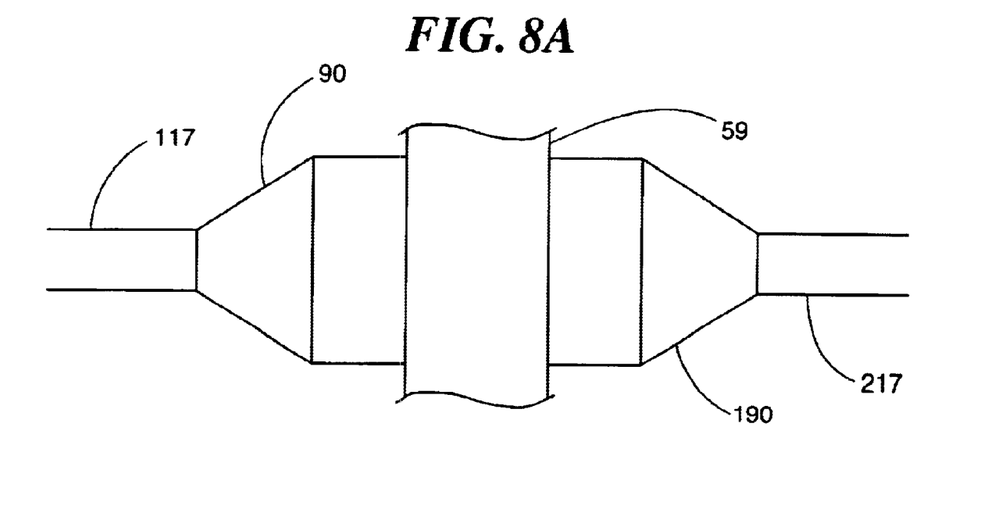
FIGS. 8A and 8B are schematic views showing ways to reduce diffraction of light passing between waveguides.

As depicted in FIG. 8A, diffraction losses in wider trenches can be reduced by increasing the waveguide widths using tapers 90, 190 integrally formed as part of the waveguides 117, 217. Alternatively, the tapers 90, 190 may be separate components attached to the waveguides 117, 217.

Moreover, only one of the two tapers 90, 190 could be provided. In such an embodiment, only output waveguide 217 would be provided with taper 190, so that light would leave input waveguide 117, pass through trench 59, enter taper 190 and from there pass into waveguide 217.

Figure 8B:
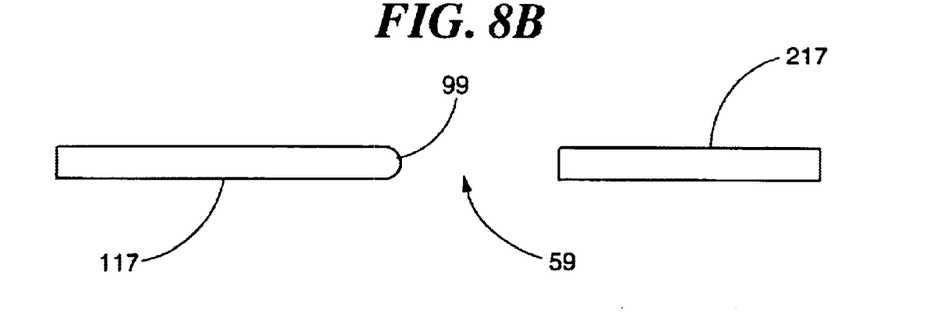

With reference to FIG. 8B, a lens 99 may be provided at an output of waveguide 117 to minimize the diffraction of light as it exits the waveguide 117 and propagates through and across the trench 59. While such a lens 99 could be formed in a variety of ways, an etched lens is presently preferred.

In order to maximize the amount of light transferred the waveguides 49 should be arranged so that substantially all of the light, after leaving one waveguide and passing through the phase shift element 53, then enters into the other waveguide. Because there may be diffraction of the light beam each time it passes between air and the phase shifter 51, the beam ultimately output from the phase shifter 51 may be somewhat larger than the original incident beam. While it may not be necessary to compensate for this diffraction, the diffraction can, if desired, be accommodated by increasing the width of the waveguide 49 into which the light beam passes after it leaves the phase shift element 53, or by using a lens to reshape the output beam. Other ways to compensate for beam diffraction also could be employed.

The waveguides 49 are separated by and disposed around trench 59, and are preferably arranged in a coaxial manner about the same optical path defined by their respective cores. The waveguides 49 are separated by a distance insufficient to affect the transmission characteristics of an optical signal propagating from one waveguide across trench 59 to the other waveguide, even though the optical signal experiences different refractive indices as it propagates from one waveguide to the other. Thus, even though an optical signal passing between waveguides 49 must completely traverse the trench, the distance over which the optical signal must travel between the waveguides 49 is small enough so as to not affect the optical transmission characteristics of that signal. Thus, while the trench is large enough to allow for the finite thickness of the mirror to be placed inside the trench, the trench should also be as small as possible to minimize the light diffraction in the trench gap.

It also may desirable for the trench 59 to be inclined relative to the axis along which the waveguides 117, 217 are arranged (not shown). Preferably the trench 59 is inclined relative to that axis at an angle ranging from approximately 4° to 8°, and more preferably, from approximately 5° and 7°, and most preferably, approximately 6°. This geometry prevents light reflecting off the phase shift element 53 from being directed back into waveguide 117.

The trench 59 in which the phase shift element 53 moves is located approximately equidistant from the input and output waveguides 49. The dimensions of the trench 59 also should be such that sufficient room is left for the phase shift element 53 to move in the trench 59 without obstruction.

As shown in FIGS. 2, 3 and 5, the phase shift element 53 is affixed to actuator 55 by link 57 and is arranged to move reciprocally without interference in and along trench 59. In an embodiment of the present invention, and as depicted in FIG. 2, the phase shift element 53 may be selectively moved into and out of the optical path along a line C generally parallel with a surface 159 defined in the trench 59. The actuator 55 thus enables selective movement of the phase shift element 53 into and out of the optical path defined through the trench 59 by the waveguides 117, 217, and selective positioning of the phase shift element 53 to any of a plurality of positions within the optical path. A phase shift of 0° or 180° (π) may thus be introduced in an optical signal passing through the phase shift element 53 depending upon the position of the element 53.

It should be understood that the direction of movement of the phase shift element 53 is not limited to movement in and along the trench 59. Phase shift element 53 may be moved in any direction which guides it into and out of the optical path, or which provided selective positioning within the optical path. With reference to FIG. 6B, phase shift element 53 is connected to actuator 155 by link 157. Phase shift element 153 can be reciprocated by the actuator 155 into and out of the optical path, as indicated by arrow D, along a line generally intersecting the surface 159, or similarly, along a diagonal line intersecting the surface 159. Link 57 is preferably made from a light-weight, stiff material.

Actuator 55 serves to move the phase shift element 53 into and out of the optical path. While any suitable actuator could be used to implement this invention, it is presently thought that either an electrothermal or electromechanical type actuator would be preferred.

Electrothermal actuators are in general known in the art, and therefore will not be described in precise detail. For the purposes of this invention, it will be appreciated that any electrothermal actuator could be used which sufficiently changes its size in response to the application of energy.

One benefit to using electrothermal actuators is that such actuators may be latching-type devices maintain its position without the continuous application of energy.

Although electrothermal actuators are relatively simple to manufacture and operate, they are relatively slow to act, and introduce heat to the system. Thus, other actuators may be used instead.

Electrostatic actuators could be used to move the phase shift element. Benefits of electrostatic actuators include high operating speed, low energy consumption, and minimal system heating.

Another aspect of the present invention compensates for optical return loss (ORL) caused when an optical signal passes between materials having different refractive indices, which may occur here where the optical signal passes from waveguide 117, across trench 59, through phase shift element 53, and into waveguide 217. The difference in refractive indices of those materials, particularly between the core 39 of waveguides 117, 217, the medium 61 provided in trench 59, and the phase shift element 53, may cause part of the optical signal (in terms of optical power) to be reflected by the phase shift element 53 and propagate back into the waveguide 117 and along the optical path, for example. That reflected signal can disadvantageously reflect back to and possible destabilize the optical signal source.

Figure 9:
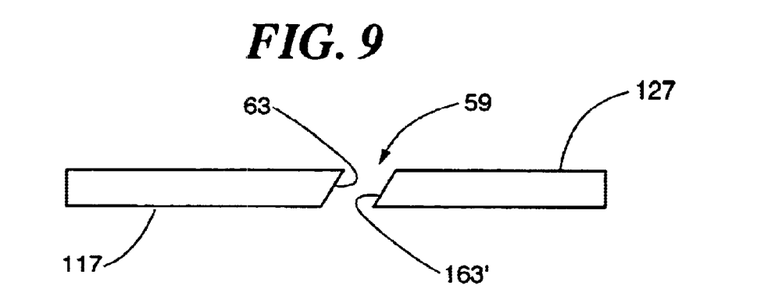
FIG. 9 is a schematic view showing waveguides with angled facets.

With reference now to FIG. 9, by suitably angling the ends 63, 163 which border trench 59, any reflected signal is directed away from the waveguide core 39 and toward the cladding 43 or 45 (see, e.g., FIG. 4), thereby preventing the reflected light from interfering with the optical signal being guided by and propagating in the waveguides 117, 217'. In an embodiment of the present invention, the ends 63, 163 could be disposed at an angle ranging from about 6° to 10°, and more preferably, about 8°, to minimize the loss due to a reflected optical signal. It is preferable to keep the ends 63, 163 substantially vertical relative to the substrate 37, and to bevel the ends 63, 163 along a plane perpendicular to the plane of the substrate 37. A further benefit to this arrangement is the destruction of the Fabry-Perot cavity which would be formed were the ends 63, 163 perpendicular to one another.

In another aspect of the present invention, optical return loss may be further minimized by applying an antireflective coating (not shown) to at least one of the waveguide ends 63, 163.

Figures 10A, 10B:
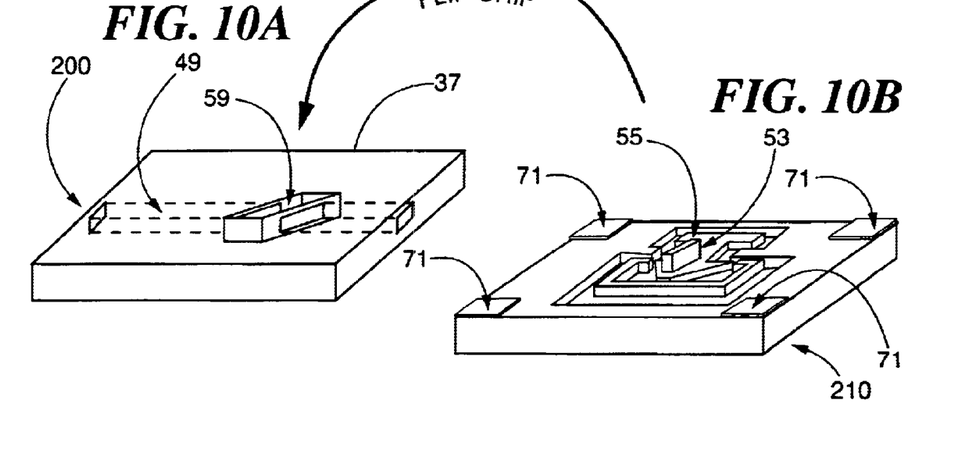
FIGS. 10A and 10B depict the assembly of an optical switch in accordance with an embodiment of the present invention.

The MZI 13 of the present invention, and an optical switch 7 formed therefrom, may be monolithically formed or assembled using a flip-chip manufacturing technique, the latter being generally depicted in FIGS. 10A and 10B. In flip-chip manufacturing, the waveguides. 49, 49' and trench 59 are monolithically formed on a first chip 200 using known semiconductor fabrication techniques and processes (e.g., deposition, etching, etc.). The phase shift element 53, actuator 55 and spacers 75 are formed on a second chip 210. Prior to assembly, the two chips 200, 210 are oriented to face each other, and aligned so that corresponding parts (e.g., phase shift element 53 and trench 59) of the chips oppose one another. Spacers 75 regulate the distance between chips 200, 210 as they are joined, and keep the chips from being pressed too close together. The spacers 75 may also be used to insure that the chips 200, 210 are joined in proper registration with each other. The chips are then joined in known fashion.

Alternatively, in another embodiment of the present invention, the MZI 13 of the present invention, and switches 7 constructed therefrom, may be constructed by monolithically forming the various parts (e.g., waveguides, phase shifter (phase shift element, link and actuator)). In such an embodiment, the various parts of the MZI 13 and switch 7 are formed on a single substrate 37 through the selective deposition and removal of different layers of material using now known or hereafter developed semiconductor etching techniques and processes. One of the benefits of monolithic fabrication is that it avoids the need to register the different components before the two substrates are joined.

Figure 11A:
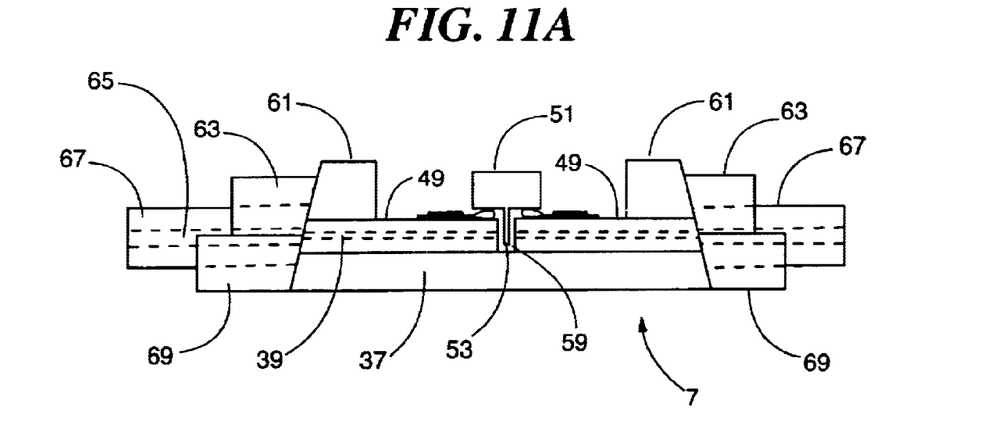
FIGS. 11A and 11B are partial side cross-sectional views showing portions of the structure of optical switches in accordance with the present invention manufactured using flip-chip and monolithic fabrication techniques, respectively, together with external components and connecting hardware.
Figure 11B:
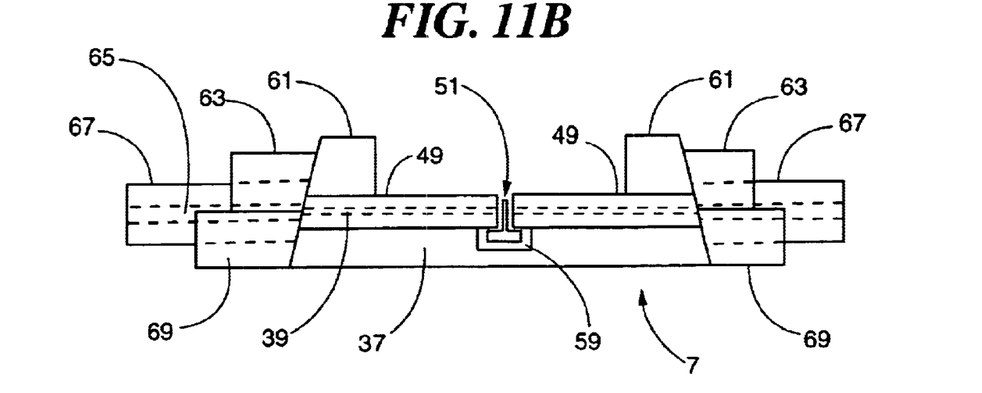

Referring to FIGS. 11A and 11B, both a flip-chip and monolithically formed optical switches 7 in accordance with the present invention are there respectively depicted. Both figures depict connection of the optical switch 7 to external optical components such as, for example, optical fibers 67, such that waveguide cores 39 optically align with fiber cores 65. Each optical fiber 67 is supported by a grooved member 69, and secured in place using a fiber lid 71. A glass cover 73 protects the underlying components. Alternative ways of securing the optical fibers, or of using other light pathways, also could be used.

One difference between the two fabrication techniques is the location of the phase shifter 51: above the waveguides for flip-chip and within the substrate 39 for monolithic.

The above-described semiconductor materials and relative refractive indices are illustrative, non-limiting examples of embodiments of the waveguide structure of the present invention.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A Mach-Zehnder interferometer comprising:
   a first arm having a first optical path;
   a second arm having a second optical path; and
   an optical phase shifter for introducing a phase into an optical signal passing through the second optical path, said optical phase shifter comprising;

a first waveguide having a core having an associated index of refraction, the first waveguide being part of the second optical path;

a second waveguide having a core having an associated index of refraction, the second waveguide being part of the second optical path, the first and the second waveguides being separated from each other by a predetermined distance across a trench that contains a medium with an associated index of refraction;

a phase shift element disposed in the trench between the first and second waveguides and selective movable relative to the first and second waveguides between a first position in which the optical signal passing from the first waveguide to the second waveguide does not pass through the phase shift element, and a second position in which the optical signal passing from the first waveguide to the second waveguide passes through the phase shift element to shift the optical signal in phase relative to an optical signal passing along the first optical path.

2. A Mach-Zehnder interferometer according to claim 1, wherein said phase shift element introduces a fixed phase shift into the optical signal.

3. A Mach-Zehnder interferometer according to claim 2, wherein said fixed phase shift is a substantially π phase shift.

4. A Mach-Zehnder interferometer according to claim 1, wherein said phase shift element is a rectangular prism.

5. A Mach-Zehnder interferometer according to claim 1, wherein the first waveguide and the second waveguide are separated across the trench by a distance of not more than approximately 40 μm.

6. A Mach-Zehnder interferometer according to claim 1, wherein the trench has a substantially constant depth.

7. A Mach-Zehnder interferometer according to claim 1, wherein the trench has a variable depth.

8. A Mach-Zehnder interferometer according to claim 1, wherein the first waveguide has a facet through which the optical signal exits the first waveguide to enter the trench, and wherein the second waveguide has a facet through which the optical signal leaving the trench enters the second waveguide.

9. A Mach-Zehnder interferometer according to claim 8, wherein at least one of the facets is angled with respect to that waveguide's axis.

10. A Mach-Zehnder interferometer according to claim 8, wherein each of the facets is angled with respect to the corresponding waveguide's axis.

11. A Mach-Zehnder interferometer according to claim 1, wherein the trench has a surface and wherein the phase shift element is caused to move between the first and the second positions along a line generally parallel to the surface.

12. A Mach-Zehnder interferometer according to claim 1, wherein the trench has a surface and wherein the phase shift element is caused to move between the first and the second positions along a line generally intersecting the surface.

13. A Mach-Zehnder interferometer according to claim 1, wherein at least one of the first and second waveguides is formed on a substrate and the trench is formed in the substrate.

14. A Mach-Zehnder interferometer according to claim 1, wherein the trench is disposed at an angle of between approximately 4° to 8° relative to the optical path.

15. A Mach-Zehnder interferometer according to claim 1, further comprising an actuator connected to the phase shift element, wherein the first and second waveguides lie in a plane, and the actuator causes the phase shift element to translate along a line parallel to the plane.

16. A Mach-Zehnder interferometer according to claim 1, further comprising an actuator connected to the phase shift element, wherein the first and second waveguides lie in a plane, and the actuator causes the phase shift element to move along a line intersecting the plane.

17. A Mach-Zehnder interferometer according to claim 1, wherein at least one of the core of the first waveguide and the core of the second waveguide is approximately 7–15 μm wide and approximately 4–7μm thick.

18. A switch for receiving and switching an optical signal, said switch comprising:

a Mach-Zehnder interferometer comprising;

a first arm having an optical path;

a second arm having an optical path; and an optical phase shifter for introducing a phase into the optical signal passing through the second path, said optical phase shifter comprising;

a first waveguide having a core having an associated index of refraction, the first waveguide being part of the and an output facet, the first waveguide being part of the second optical path;

a second waveguide having a core having an associated index of refraction, the second waveguide being part of the second optical path, the first and the second waveguides being separated from each other by a predetermined distance across a trench that contains a medium with an associated index of refraction;

a phase shift element disposed in the trench between the first and the second waveguides, and being selectively movable relative to the first and the second waveguides between a first position in which the optical signal passing from the first waveguide to the second waveguide does not pass through the phase shift element, and a second position in which the optical signal passing from the first waveguide to the second waveguide passes through the phase shift element to shift the optical signal in phase relative to an optical signal passing along the first optical path.

19. A switch according to claim 18, wherein said phase shift element introduces a fixed phase shift into the optical signal.

20. A switch according to claim 19, wherein said fixed phase shift is a substantially π phase shift.

21. A switch according to claim 18, wherein said phase shift element is a rectangular prism.

22. A switch according to claim 18, wherein the first waveguide and the second waveguide are separated across the trench by a distance of approximately 8–40 μm.

23. A switch according to claim 18, wherein the trench has a substantially constant depth.

24. A switch according to claim 18, wherein the trench has a variable depth.

25. A switch according to claim 18, wherein the first waveguide has a facet through which the optical signal exits the first waveguide to enter the trench, and wherein the second waveguide has a facet through which the optical signal leaving the trench enters the second waveguide.

26. A switch according to claim 25, wherein at least one of the facets is angled with respect to that waveguide's axis.

27. A switch according to claim 25, wherein each of the facets is angled with respect to the corresponding waveguide's axis.

28. A switch according to claim 18, wherein the trench has a surface and wherein the phase shift element is caused to move between the first and the second positions along a line generally parallel to the surface.

29. A switch according to claim 18, wherein the trench has a surface and wherein the phase shift element is caused to move between the first and the second positions along a line generally intersecting the surface.

30. A switch according to claim 18, wherein at least one of the first and second waveguides is formed on a substrate and the trench is formed in the substrate.

31. A switch according to claim 18, wherein the trench is disposed at an angle of approximately 4° to 8° relative to the optical path.

32. A switch according to claim 18, further comprising an actuator connected to the phase shift element,
wherein the first and second waveguides lie in a plane, and the actuator causes the phase shift element to translate along a line parallel to the plane.

33. A switch according to claim 18, further comprising an actuator connected to the phase shift element,
wherein the first and second waveguides lie in a plane, and the actuator causes the phase shift element to move along a line intersecting the plane.

34. A switch according to claim 18, wherein at least one of the first and the second waveguide cores is approximately 7–15 $\mu$m wide and approximately 4–7 $\mu$m thick.

* * * * *